United States Patent
Lee

(10) Patent No.: US 12,103,259 B1
(45) Date of Patent: Oct. 1, 2024

(54) LAMINATING SYSTEM, INSERT INJECTION SYSTEM INCLUDING LAMINATING PROCESS, LAMINATING METHOD, AND INSERT INJECTION METHOD INCLUDING LAMINATING PROCESS

(71) Applicant: Jung Soo Lee, Busan (KR)

(72) Inventor: Jung Soo Lee, Busan (KR)

(*) Notice: Subject to any disclaimer, the term of this patent is extended or adjusted under 35 U.S.C. 154(b) by 0 days.

(21) Appl. No.: 18/501,359

(22) Filed: Nov. 3, 2023

(30) Foreign Application Priority Data

Mar. 2, 2023 (KR) .................. 10-2023-0027837

(51) Int. Cl.
| | |
|---|---|
| *B29D 7/01* | (2006.01) |
| *B29K 705/12* | (2006.01) |
| *B32B 7/12* | (2006.01) |
| *B32B 15/08* | (2006.01) |
| *B32B 15/18* | (2006.01) |

(52) U.S. Cl.
CPC .................. *B29D 7/01* (2013.01); *B32B 7/12* (2013.01); *B32B 15/08* (2013.01); *B32B 15/18* (2013.01); *B29K 2705/12* (2013.01)

(58) Field of Classification Search
CPC . B29C 45/0053; B29C 45/0062; B29C 45/14; B29C 65/5057; B29C 65/52; B29C 65/70; B29C 65/82; B29C 66/0222; B29C 66/024; B29C 66/742
See application file for complete search history.

(56) References Cited

FOREIGN PATENT DOCUMENTS

| EP | 00269808 A1 | 6/1988 |
|---|---|---|
| JP | S63-168333 A | 7/1988 |
| JP | 2001-212906 A | 8/2001 |
| JP | 2008-049604 A | 3/2008 |
| KR | 10-0812213 B1 | 3/2008 |
| KR | 10-2015-0029276 A | 3/2015 |

OTHER PUBLICATIONS

Refusal for KR2023-0027837.*
Grant for KR2023-0027837.*
Translation of KR102627926.*
Translation of claims in KR102569668.*
Translation of description in KR102569668.*

* cited by examiner

*Primary Examiner* — Sonya M Sengupta
(74) *Attorney, Agent, or Firm* — Bridgeway IP Law Group, PLLC; Jihun Kim

(57) ABSTRACT

A laminating system, an insert injection system including a laminating process, a laminating method, and an insert injection method including the laminating process, which can enhance adhesive force between a metal sheet made of a SUS material and plastic resin, which are raw materials for injection-molded products, such as automobile window moldings, when the injection-molded products are manufactured, are described. The present system can enhance adhesive force between a metal sheet made of a SUS material and plastic resin through introduction of film-type adhesive and dedicated adhesive equipment, which are raw materials for injection-molded products, such as automobile window moldings, when the injection-molded products are manufactured, and can save labor costs generated due to manual work by workers and improve the workshop environment (e.g., the unique smell of solvent-type bond/contamination).

6 Claims, 7 Drawing Sheets

| Company | Photograph | Division | Peel strength |
|---|---|---|---|
| Solvent based bond | | Sample1 | 9.78kgf |
| | | Sample2 | 9.28kgf |
| | | Sample3 | 7.79kgf |
| | | Average strength | 8.95kgf |
| Film-Type bond | | Sample1 | 13.8kgf |
| | | Sample2 | 17.4kgf |
| | | Sample3 | 17.3kgf |
| | | Average strength | 16.16kgf |

FIG. 3

LAMINATING SYSTEM, INSERT INJECTION SYSTEM INCLUDING LAMINATING PROCESS, LAMINATING METHOD, AND INSERT INJECTION METHOD INCLUDING LAMINATING PROCESS

CROSS-REFERENCE TO RELATED APPLICATIONS

This application claims priority from Korean Patent Application No. 10-2023-0027837, filed on Mar. 2, 2023, in the Korean Intellectual Property Office, which is incorporated herein by reference in its entirety.

BACKGROUND OF THE INVENTION

Field of the Invention

The present invention relates to a laminating system, an insert injection system including a laminating process, a laminating method, and an insert injection method including the laminating process, and more specifically, to a laminating system, an insert injection system including a laminating process, a laminating method, and an insert injection method including the laminating process, which can enhance adhesive force between a metal sheet made of a SUS material and plastic resin, which are raw materials for injection-molded products, such as automobile window moldings, when the injection-molded products are manufactured.

Background Art

In general, window moldings for a vehicle are manufactured by an insert injection process, and molding is manufactured by a process of press-molding a metal sheet (of SUS material), manually applying solvent-based adhesive on one side of the metal sheet, and injecting plastic resin onto the side where the adhesive has been applied.

During the insert injection process, an adhesive coating process is necessary to bond the metal sheet and the plastic resin. For the adhesive coating process, a worker applies solvent-based adhesive onto the rear surface of the metal sheet. So, the conventional insert injection process has several disadvantages, such as excessive labor costs and deterioration of the working environment.

On the other hand, the background technology is technical information that the inventor has held to derive the present invention or that has been acquired during the deducing process of the present invention, and cannot necessarily be deemed a technology publicly disclosed to the general public prior to the application of the present invention.

SUMMARY OF THE INVENTION

Accordingly, the present invention has been made to solve the above-mentioned problems occurring in the prior arts, and it is an objective of the present invention to provide a laminating system, an insert injection system including a laminating process, a laminating method, and an insert injection method including the laminating process, which can enhance adhesive force between a metal sheet made of a SUS material and plastic resin through introduction of film-type adhesive and dedicated adhesive equipment, which are raw materials for injection-molded products, such as automobile window moldings, when the injection-molded products are manufactured.

The objectives of the present disclosure are not limited to those mentioned above, and other objectives not mentioned herein will be clearly understood by those skilled in the art from the following description.

To accomplish the above object, according to the present invention, there is provided a laminating system including: a unwinding part which continuously supplies the metal sheet while rotating and unwinding the metal sheet, which is wound in a roll form; a first heating chamber part which heats the metal sheet continuously delivered from the winding part to a predetermined temperature; a film bond adhesion part which continuously moves the metal sheet and the film-type bond, which were heated by the first heating chamber, between a first adhesive roller and a second adhesive roller, which are closely arranged in a vertical direction to be rotatable, and continuously adheres the film-type bond to one side of the moving metal sheet; a second heating chamber part which heats the metal sheet, to which the film-type bond transferred from the film bond adhesion part is adhered, to a predetermined temperature to strengthen adhesive force between the film-type bond and the metal sheet; a protective tape adhesion part which adheres a surface protection vinyl (SPV) protective tape to the other side of the metal sheet where the film-type bond is not adhered; and a winding part which receives the metal sheet to which the film-type bond and the surface protection vinyl (SPV) protective tape are adhered, and winds the metal sheet in a roll form.

An insert injection system including a laminating process according to an embodiment of the present invention may include: a material receiving part which receives the metal sheet of SUS material; a laminating system which adheres a film-type bond to one side of the metal sheet prepared in the material receiving part through a laminating process; a pressing part which performs a press molding on the metal sheet to which the film-type bond is adhered to manufacture a molded object; a first injection molding part which performs a first injection molding by injecting plastic resin onto one side of the molded object, to which the film-type bond is adhered, to manufacture an injected product; a second injection molding part which performs a second injection molding by injecting plastic resin to one side or both sides of the injected product to enhance the rigidity of the injected product; and a machining operation part which receives the injected product from the second injection molding part, and performs a post-injection process.

A laminating method according to an embodiment of the present invention includes: a unwinding step in which a unwinding part continuously supplies a metal sheet of SUS material, which is wound in a roll form while rotating and unwinding the metal sheet; a first heating step in which a first heating chamber part heats the metal sheet continuously delivered from the winding part to a predetermined temperature; a film bond adhesion step in which a film bond adhesion part continuously moves the metal sheet and the film-type bond, which were heated by the first heating chamber, between a first adhesive roller and a second adhesive roller, which are closely arranged in a vertical direction to be rotatable, and continuously adheres the film-type bond to one side of the moving metal sheet; a second heating step in which a second heating chamber part heats the metal sheet, to which the film-type bond transferred from the film bond adhesion part is adhered, to a predetermined temperature to strengthen adhesive force between the film-type bond and the metal sheet; a protective tape adhesion step in which a protective tape adhesion part adheres a surface protection vinyl (SPV) protective tape to the other side of the metal sheet where the film-type bond is not adhered; and a winding step in which a winding part receives the metal sheet to which the film-type bond and the surface protection vinyl (SPV) protective tape are adhered, and winds the metal sheet in a roll form.

An insert injection method including a laminating process according to an embodiment of the present invention includes: a material receiving step of receiving a metal sheet of SUS material; a laminating step of adhering a film-type bond to one side of the metal sheet prepared in the material receiving part through a laminating process; a pressing step of performing a press molding on the metal sheet to which the film-type bond is adhered to manufacture a molded object; a first injection molding step of performing a first injection molding by injecting plastic resin onto one side of the molded object, to which the film-type bond is adhered, to manufacture an injected product; a second injection molding step of performing a second injection molding by injecting plastic resin to one side or both sides of the injected product to enhance the rigidity of the injected product; and a machining operation step of receiving the injected product from the second injection molding part, and performing a post-injection process According to an aspect of the present invention, the laminating system, the insert injection system including the laminating process, the laminating method, and the insert injection method including the laminating process can enhance adhesive force between a metal sheet made of a SUS material and plastic resin through introduction of film-type adhesive and dedicated adhesive equipment, which are raw materials for injection-molded products, such as automobile window moldings, when the injection-molded products are manufactured, and can save labor costs generated due to manual work by workers and improve the workshop environment (e.g., the unique smell of solvent-type bond/contamination).

The effects of the present disclosure are not limited to the above-mentioned effects, and other effects, which are not specifically mentioned herein, will be clearly understood by those skilled in the art from the following description.

BRIEF DESCRIPTION OF THE DRAWINGS

FIG. 3 is a diagram illustrating a product evaluation result of an injection-molded product manufactured by the insert injection method including the laminating process according to an embodiment of the present invention.

DETAILED DESCRIPTION OF THE PREFERRED EMBODIMENT

Figure 1:
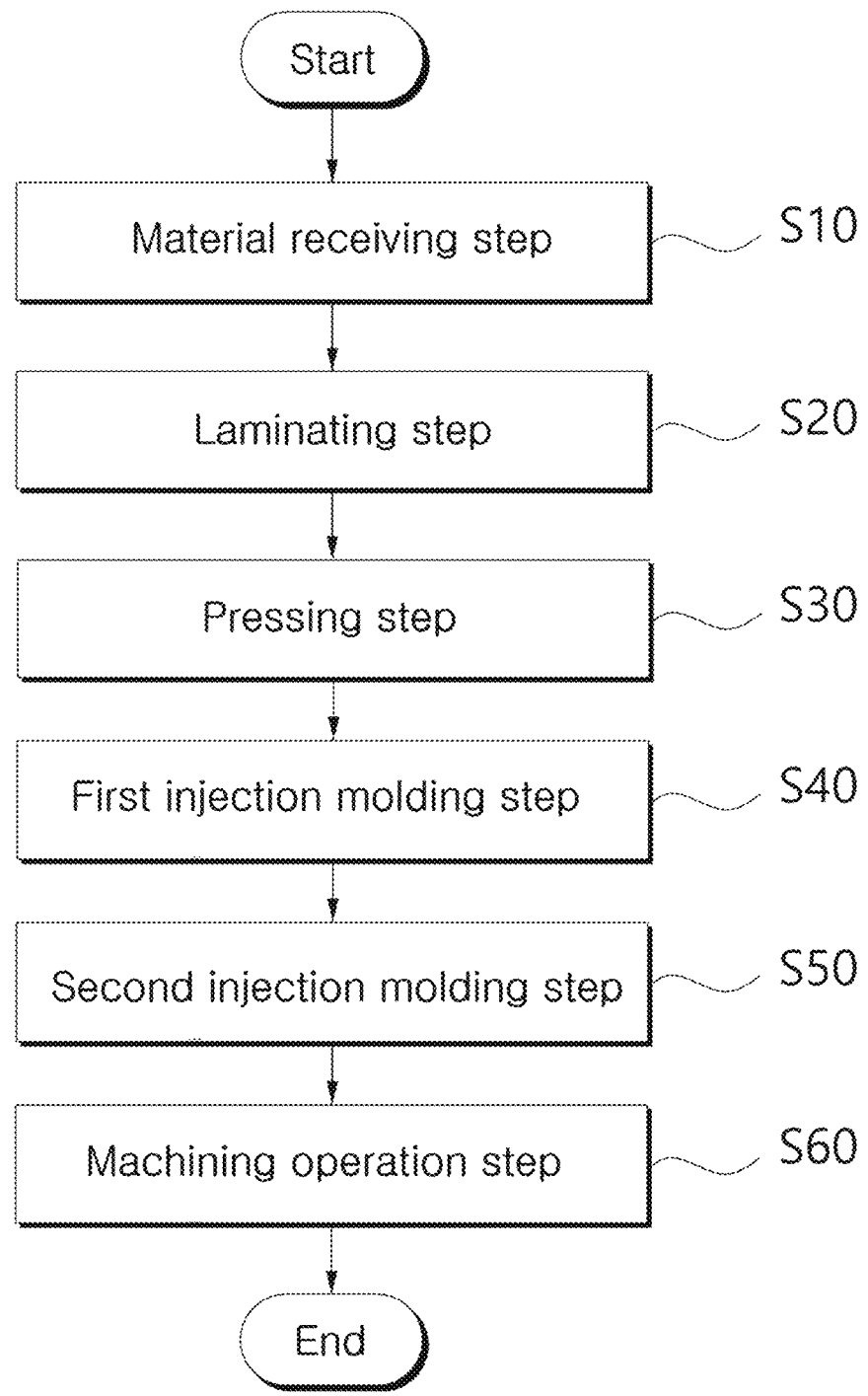
FIG. 1 is a flowchart illustrating an insert injection method including a laminating process according to an embodiment of the present invention.

Specific embodiments of the present invention are described in detail below with reference to the accompanying drawings. The embodiments are described in detail in order for those skilled in the art to readily implement the present invention. It is to be understood that the various embodiments of the present invention are different from each other, but do not need to be exclusive. For example, a specific shape, structure and characteristic described in this specification in connection with an embodiment may be implemented as another embodiment without departing from the spirit and scope of the present invention. It is also to be understood that the position or arrangement of an individual element within each disclosed embodiment may be changed without departing from the spirit and scope of the present invention. Accordingly, the detailed description hereinafter is not intended to have a limited meaning, and the range of right of the present invention is restricted by only the attached claims along with the entire range equivalent to things claimed by the claims, if it is appropriately described. Similar reference numerals in the drawings denote the same or similar functions from several aspects.

Hereinafter, preferred embodiments of the present invention will be described in detail with reference to the accompanying drawings FIG. 1 is a flowchart illustrating an insert injection method including a laminating process according to an embodiment of the present invention.

Referring to FIG. 1, the insert injection method including a laminating process according to an embodiment of the present invention comprises:

a step (S10) in which a material receiving part 10 receives a metal sheet S1 made of SUS material;

a step (S20) of adhering a film-type bond S2 to one side of the metal sheet S1 prepared in the material receiving step (S10) through a laminating process;

a step (S30) in which a laminating system 20 performs a press molding on the metal sheet S1 to which the film-type bond S2 is adhered to manufacture a molded object;

a first injection molding step (S40) in which a pressing part 30 injects plastic resin onto one side of the molded object to which the film-type bond S2 is adhered to manufacture an injected product;

a second injection molding step (S50) in which a first injection molding part 40 injects plastic resin to one side or both sides of the injected product to enhance the rigidity of the injected product; and a step (S60) in which a machining operation part 60 receives the injected product manufactured by the second injection molding step (S50) from a second injection molding part 50 to perform a post-injection process.

The insert injection method having the above-described steps and including a laminating process according to an embodiment of the present invention is carried out using the insert injection system 1 described below in FIG. 2.

Figure 2:
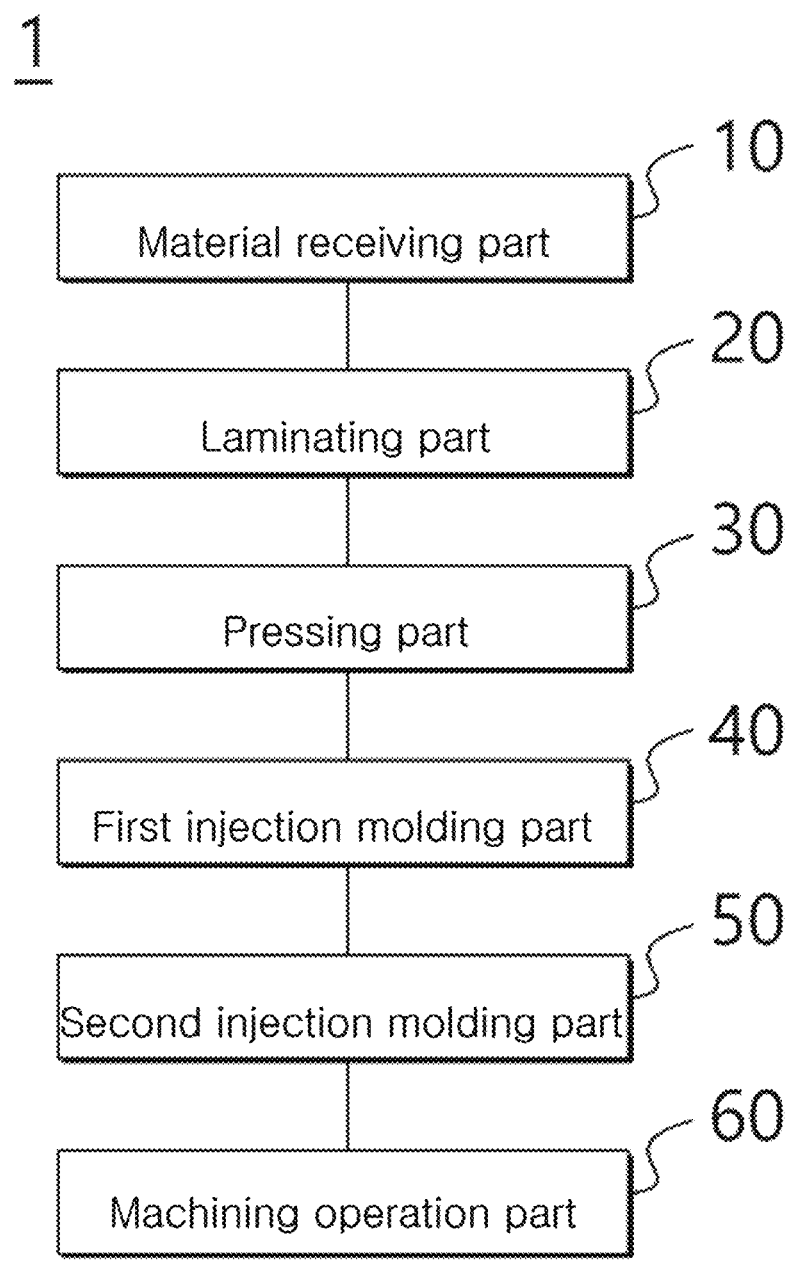
FIG. 2 is a schematic diagram illustrating a configuration of an insert injection system including a laminating process according to an embodiment of the present invention.

The insert injection method including the laminating process according to an embodiment of the present invention is performed by using an insert injection system 1 including the laminating process according to an embodiment of the present invention as illustrated in FIG. 2.

Referring to FIG. 2, the insert injection system 1 including the laminating process according to an embodiment of the present invention comprises a material receiving part 10, a laminating system 20, a pressing part 30, a first injection molding part 40, a second injection molding part 50, and a machining operation part 60.

The material receiving part 10 receives a metal sheet S1 made of SUS430 (0.4 T) material.

The laminating system 20 adheres a film-type bond S2 to one side of the metal sheet S1 prepared in the material receiving part 10 through a laminating process.

The pressing part 30 performs a press molding on the metal sheet S1 to which the film-type bond S2 is adhered to manufacture a molded object.

The first injection molding part 40 performs a first injection molding by injecting plastic resin onto one side of the molded object, to which the film-type bond S2 is adhered, to manufacture an injected product.

The second injection molding part 50 performs a second injection molding by injecting plastic resin to one side or both sides of the injected product to enhance the rigidity of the injected product.

The machining operation part 60 receives the injected product from the second injection molding part 50, and performs a post-injection process (e.g., burr removal or defective product sorting).

It was found that the insert injection method including the laminating process according to an embodiment of the present invention, by using the laminating system 20, obtained an average strength of 7.21 kgf, which was higher than the conventional method of manufacturing an injected product using solvent-based bond, and confirmed an approximately 1.8 times increase in adhesive strength.

Therefore, according to an aspect of the present invention, the insert injection method including the laminating process can enhance adhesive force between a metal sheet made of a SUS material and plastic resin through introduction of film-type adhesive and dedicated adhesive equipment, which are raw materials for injection-molded products, such as automobile window moldings, when the injection-molded products are manufactured, and can save labor costs generated due to manual work by workers and improve the workshop environment (e.g., the unique smell of solvent-type bond/contamination).

In an embodiment, in first heating step (S200), an inner space of the first heating chamber 200 in which the metal sheet S1 is moved is heated to a temperature of 220 to 260° C. to heat the metal sheet S1.

The film bond adhesion part 300 continuously moves the metal sheet S1 which has been heated by the first heating chamber part 200 and the film-type bond S2 which is continuously supplied from a film supply device M1 between a first adhesive roller R1 and a second adhesive roller R2 which are closely arranged in a vertical direction to be rotated, and continuously adheres the film-type bond S2 on one side of the moving metal sheet S1 (S300).

The second heating chamber part 400 heats the metal sheet S1, on which the film-type bond S2 transferred from the film bond adhesion part 300 is adhered, to a predetermined temperature so as to strengthen the adhesion of the film-type bond S2 and the metal sheet S1 (S400).

In an embodiment, in the second heating step (S400), the second heating chamber part 400 can heat the inner space, in which the metal sheet S1 is moved, to a temperature of 230° C. to 270° C. to heat the metal sheet S1 to heat the metal sheet S1 on which the film-type bond S2 is adhered.

The protective tape adhesion part 500 adheres a surface protection vinyl (SPV) protective tape S3 onto the other side of the metal sheet S1 where the film-type bond S2 is not adhered (S500).

The winding part 600 receives the metal sheet S1 to which the film-type bond S2 and the surface protection vinyl (SPV) protective tape S3 are adhered, and winds the metal sheet S1 in a roll form (S600).

Figure 6:
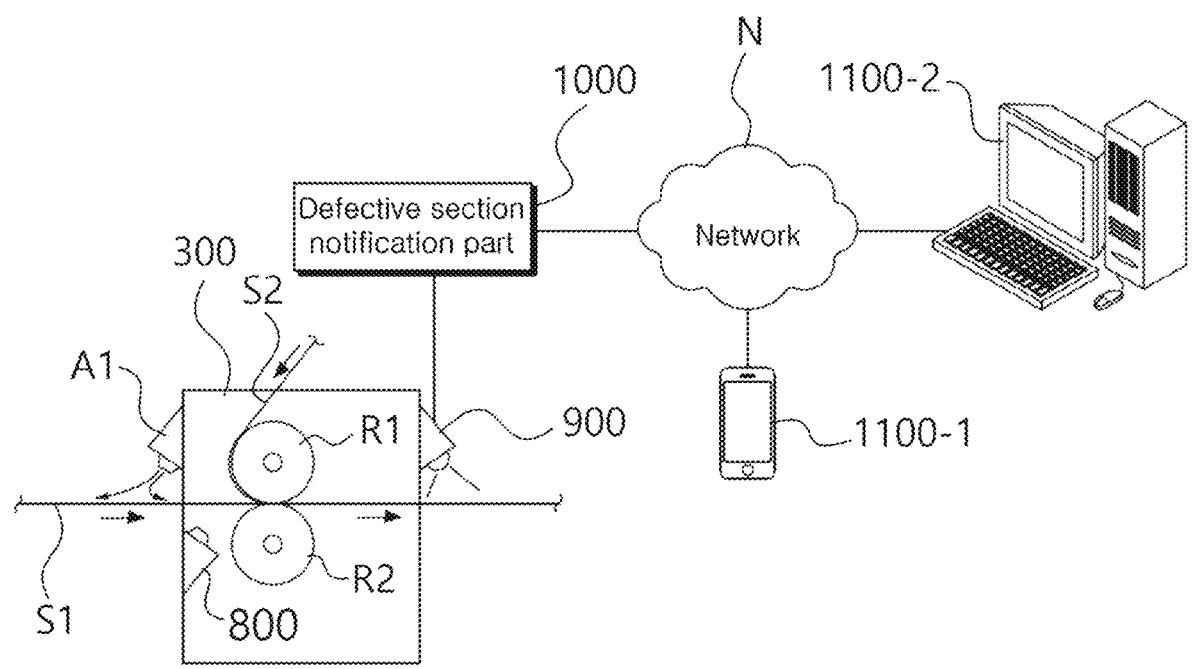
FIG. 6 is a schematic diagram illustrating an insert injection system including a laminating process according to another embodiment of the present invention.
Figure 7:
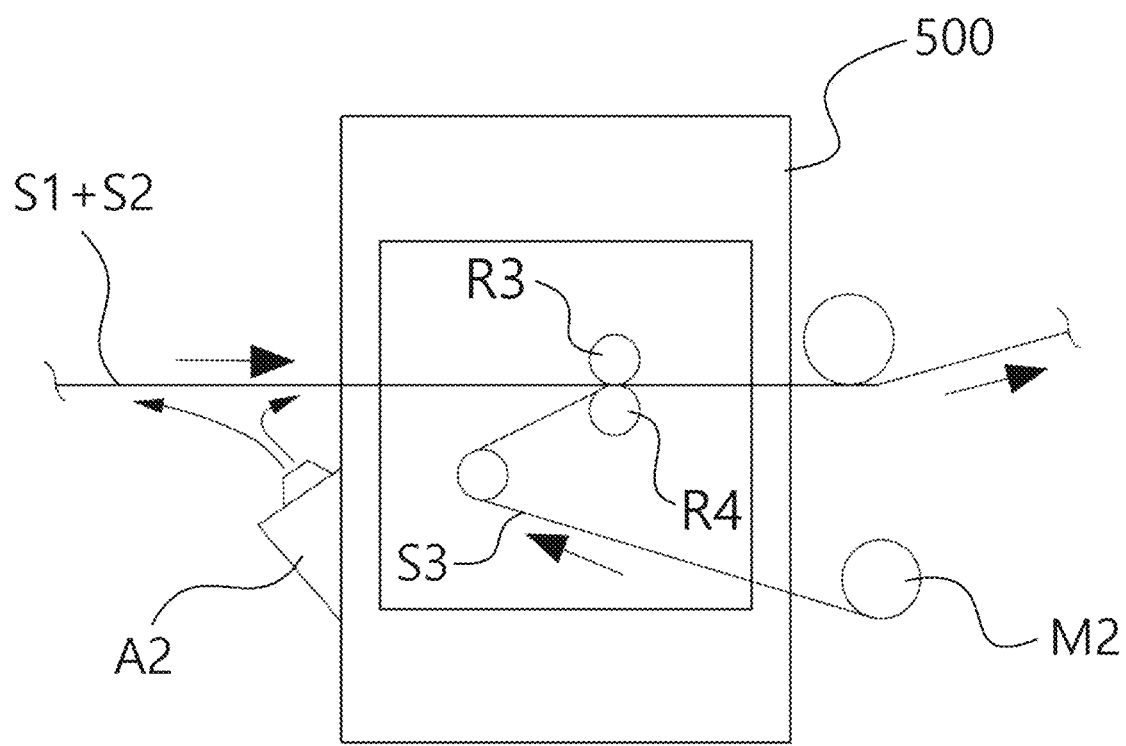
FIG. 7 is a diagram illustrating a second air blower according to the present invention.

As illustrated in FIG. 6, the laminating method (S20) having the steps according to an embodiment of the present invention can further include a defect detection step (S700) in which a defect detection part 900 detects defect of the adhesive surfaces of the metal sheet S1 and the film-type bond S2 by using vision inspection.

TABLE 1

| Div. | | No. of people | Price | Effect Amount (Month) | Effect Amount (Year) | Remark |
|---|---|---|---|---|---|---|
| Existing | Solvent-type | 45 | KR₩ 135,000,000 | KR₩ 128,000,000 | KR₩ 1,536,000,000 | Applicable to all molding items |
| Changed | Film type | 2 | KR₩ 6,00,000 | | | |
| | Maintenance cost | | KR₩ 1,000,000 | | | |

In addition, the insert injection method including the laminating process according to an embodiment of the present invention with the configuration as described above, can improve the ease of material management, minimize the odor of the bond, and enhance the uniformity of the quality of the injected product. Moreover, as indicated in Table 1, the insert injection method including the laminating process can offer various benefits in terms of manpower, cost, and the like.

Figure 4:
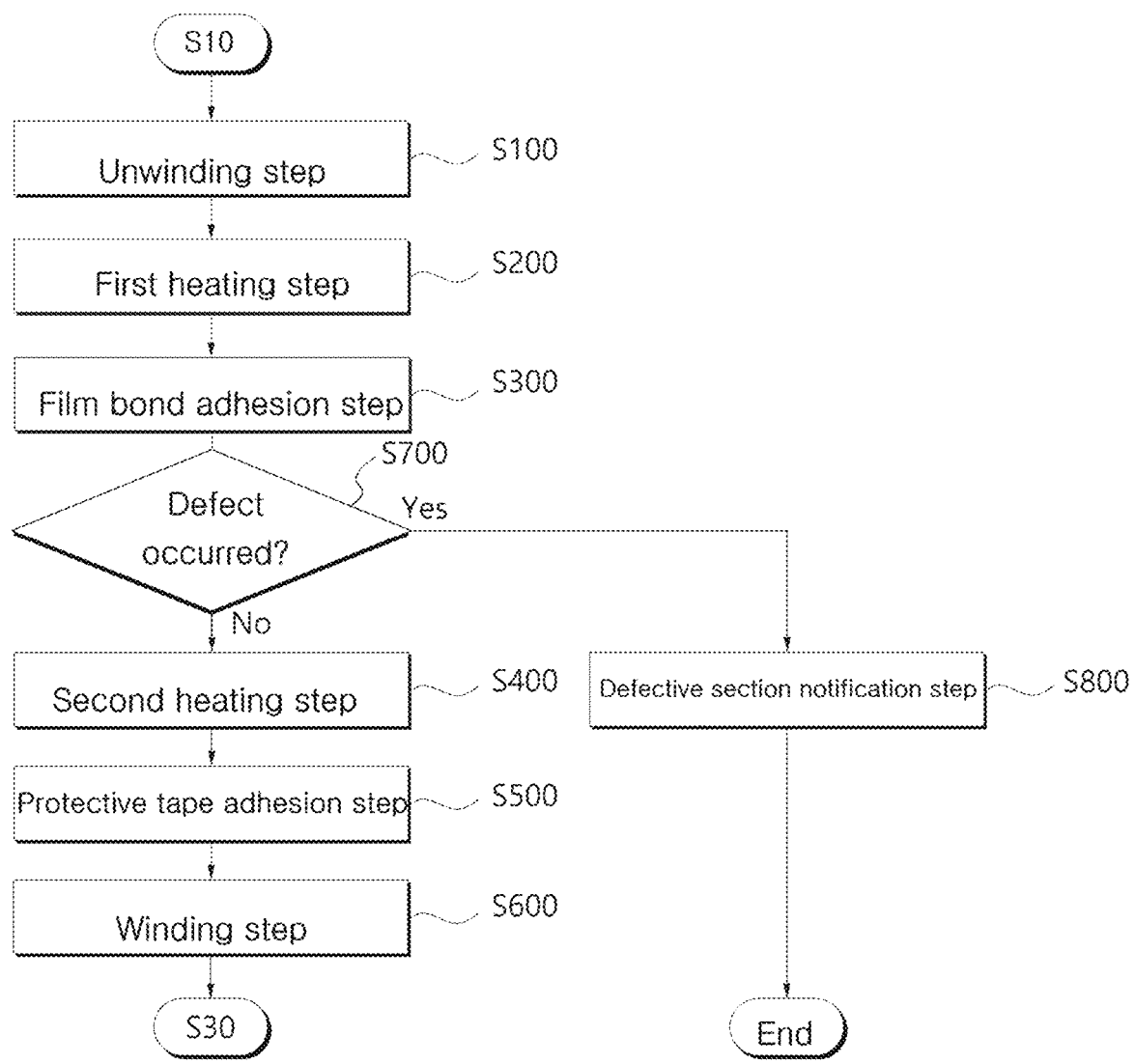
FIG. 4 is a flowchart illustrating a laminating method according to an embodiment of the present invention.

FIG. 4 is a flowchart illustrating a laminating method according to an embodiment of the present invention.

Referring to FIG. 4, in the laminating method according to an embodiment of the present invention, that is, in the laminating step (S20) of FIG. 1, a unwinding part 100 rotates and unwinds a metal sheet S1, which is wound in a roll type, to continuously supply the metal sheet S1 (S100).

A first heating chamber part 200 heats the metal sheet S1 continuously transmitted from a unwinding part 100 to a preset temperature (S200).

The laminating method (S20) having the steps according to an embodiment of the present invention can further include a defective section notification step (S700) wherein when a defect is detected in the defect detection step (S700) ("Yes" in S700 of FIG. 4) and the defect detection part 900 notifies an adhesion defect, as illustrated in FIG. 6, the defective section notification part 1000 identifies the section where the adhesion defect occurred, and requests a worker to cut and discard the identified adhesion defective section or remove the identified adhesion defective section.

As described above, the laminating method (S20) according to an embodiment of the present invention may further include a cooling step (not shown) in which a cooling part 700 cools the metal sheet S1 to which the film-type bond S2 transferred from the second heating chamber part 400 is adhered, and then, transfers the cooled metal sheet S1 to the protective tape adhesion part 500.

The laminating method (S20) according to an embodiment of the present invention may further include a roller overheating prevention step (not shown) in which a roller overheating prevention part 800 which is installed at the front end of the film bond adhesion part 300 blows cool air in the direction of the metal sheet S1 inserted into the film bond adhesion part 300 to to prevent the film-type bond S2 from being adhered to the first adhesive roller R1 or the second adhesive roller R2 as the first adhesive roller R1 or the second adhesive roller R2 is heated.

The laminating method (S20) comprising such steps as described above is carried out by using the laminating system 20 according to an embodiment of the present invention.

Figure 5:
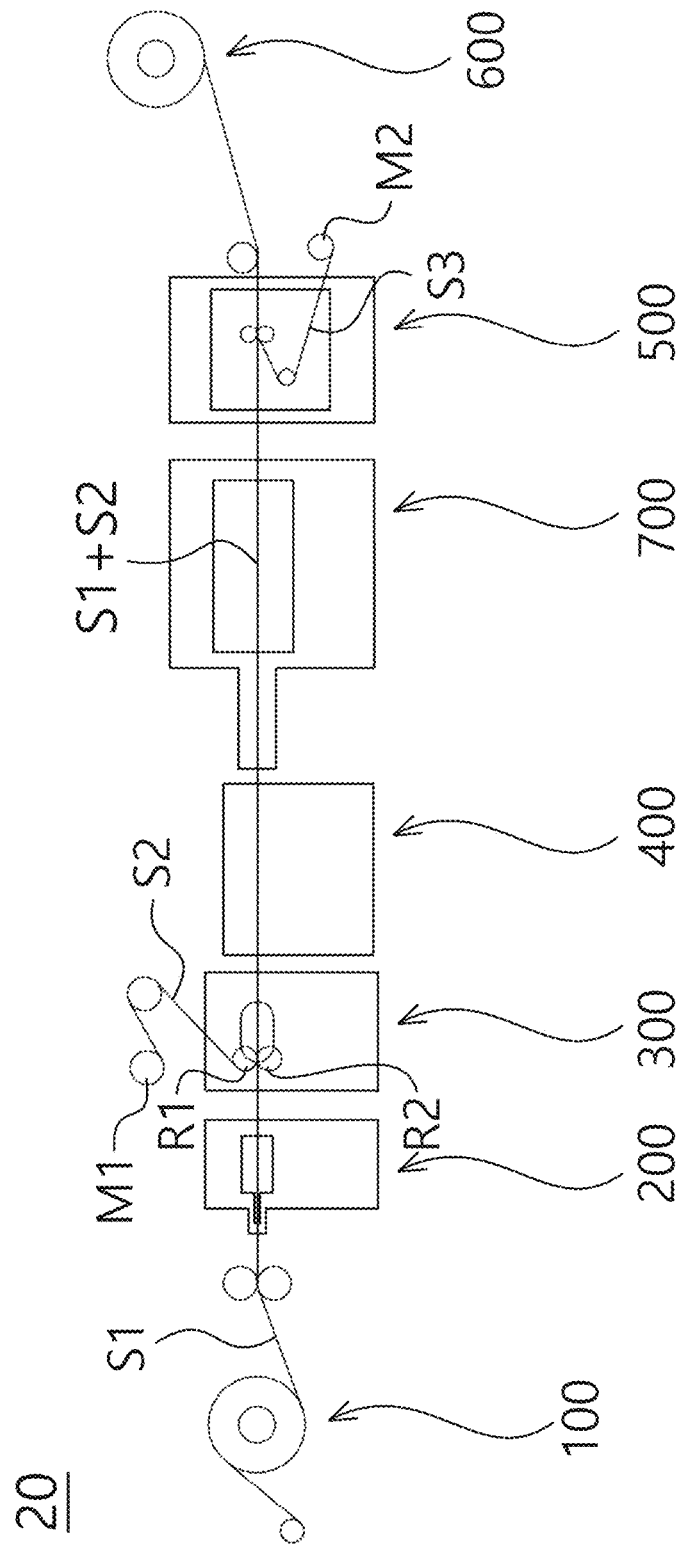
FIG. 5 is a diagram illustrating a laminating system of FIG. 3.

Referring to FIG. 5, the laminating system 20 includes an unwinding part 100, a first heating chamber part 200, a film bond adhesion part 300, a second heating chamber part 400, a protective tape adhesion part 500, and a winding part 600.

The unwinding part 100 rotates and unwinds a metal sheet S1, which is wound in a roll type, to continuously supply the metal sheet S1.

In an embodiment, the unwinding part 100 supplies the metal sheet S1 at the linear speed of 1.8 M/MIN, and can adjust the linear speed of the metal sheet S1 with an acceleration time of 20 sec±5 sec, a deceleration time of 20 sec±5 sec, and a stop time of 5 sec±1 sec.

The first heating chamber part 200 heats the metal sheet S1 continuously transmitted from the unwinding part 100 to a preset temperature.

In an embodiment, the first heating chamber part 200 heats an inner space, in which the metal sheet S1 is moved, to a temperature of 220° C. to 260° C., preferably, 240° C., to heat the metal sheet S1.

The film bond adhesion part 300 continuously moves the metal sheet S1 which has been heated by the first heating chamber part 200 and the film-type bond S2 which is continuously supplied from the film supply device M1 between a first adhesive roller R1 and a second adhesive roller R2 which are closely arranged in a vertical direction to be rotated, and continuously adheres the film-type bond S2 on one side of the moving metal sheet S1.

In an embodiment, for efficient adhesion of the metal sheet S1 and the film-type bond S2, it is preferable that the film bond adhesion part 300 sets the pressure between the first adhesive roller R1 and the second adhesive roller R2 to 8±1 kgf/cm2.

The second heating chamber part 400 heats the metal sheet S1, on which the film-type bond S2 transferred from the film bond adhesion part 300 is adhered, to a predetermined temperature so as to strengthen the adhesion of the film-type bond S2 and the metal sheet S1.

In an embodiment, the second heating chamber part 400 can heat the inner space, in which the metal sheet S1 is moved, to a temperature of 230° C. to 270° C., preferably, 250° C., to heat the metal sheet S1 to heat the metal sheet S1 on which the film-type bond S2 is adhered.

The protective tape adhesion part 500 adheres a surface protection vinyl (SPV) protective tape S3, which is continuously supplied from a protective tape supply device M2, onto the other side of the metal sheet S1 where the film-type bond S2 is not adhered.

In this case, the surface protection vinyl (SPV) protective tape S3 acts as a protective film covering the outer surface based on the final injected product (for example, vehicle molding, etc.).

In an embodiment, for efficient adhesion of the metal sheet S1 and the surface protection vinyl (SPV) protective tape S3, it is preferable that protective tape adhesion part 500 sets the pressure between a third adhesive roller R3 and a fourth adhesive roller R4 to 8±1 kgf/cm2.

The winding part 600 receives the metal sheet S1 to which the film-type bond S2 and surface protection vinyl (SPV) protective tape S3 are adhered and winds the metal sheet S1 in a roll form.

The laminating system 20 with the configuration can further include a cooling part 700.

The cooling part 700 cools the metal sheet S1 to which the film-type bond S2 transferred from the second heating chamber part 400 is adhered, and then, transfers the cooled metal sheet S1 to the protective tape adhesion part 500.

In an embodiment, the cooling part 700 can cool the metal sheet S1, to which the film-type bond S2 is adhered, to room temperature (for example, within the range of 20±5° C.) by natural cooling or forced cooling using a blower.

At this time, the film-type bond S2 may be cooled to room temperature by the cooling part 700 to become non-adhesive.

The laminating system 20 having the configuration can further include a roller overheating prevention part 800.

As illustrated in FIG. 6, the roller overheating prevention part 800 is installed in an inner space of the film bond adhesion part 300 or at the front end of the film bond adhesion part 300. That is, to prevent the film-type bond S2 from being adhered to the first adhesive roller R1 or the second adhesive roller R2 as the first adhesive roller R1 or the second adhesive roller R2 is heated, the roller overheating prevention part 800 is installed at the front end of the film bond adhesion part 300 to blow cool air in the direction of the metal sheet S1 inserted into the film bond adhesion part 300.

In an embodiment, the film bond adhesion part 300 can include a first air blower A1 which sprays heated compressed air onto the adhesive surface of the metal sheet S1 to remove dust and other foreign substances from the adhesive surface of the metal sheet S1 before the film-type bond S2 is adhered.

Here, preferably, the first air blower A1 blows air heated at about 200° C. to prevent the cooling of the metal sheet S1.

In an embodiment, the protective tape adhesion part 500 can include a second air blower A2 which sprays heated compressed air onto the adhered surface of the metal sheet S1 to remove dust and other foreign substances from the adhered surface of the metal sheet S1 before the surface protection vinyl (SPV) protective tape S3 is adhered.

The laminating system 20 with the configuration can further include a defect detection part 900 and a defective section notification part 1000.

The defect detection part 900 detects defects on the adhesive surfaces of the metal sheet S1 and the film-type bond S2 using vision inspection, and then, transmits the occurrence of defects to the defective section notification part 1000.

The defective section notification part 1000 divides the metal sheet S1 supplied from the unwinding part 100 into a predetermined length unit (for example, 1 m), and when receiving a notification of adhesive defect from the defect detection part 900, identifies the section where the adhesion defect occurred, and requests a personal terminal 1100-1 or a management terminal 1100-2 that a worker uses to cut and discard the identified adhesion defective section or remove the identified adhesion defective section.

Therefore, since the worker cuts and discards the adhesion defective section notified from the defective section notification part 1000 or performs removal of the adhesion defective section, the quality of the product is improved.

The above description is only exemplary, and it will be understood by those skilled in the art that the invention may be embodied in other concrete forms without changing the technological scope and essential features. Therefore, the above-described embodiments should be considered only as examples in all aspects and not for purposes of limitation. For example, each component described as a single type may be realized in a distributed manner, and similarly, components that are described as being distributed may be realized in a coupled manner.

The scope of the present invention is defined by the appended claims, and encompasses all modifications or alterations derived from meanings, the scope and equivalents of the appended claims.

What is claimed is:

1. A laminating method comprises:
   rotating and unwinding, by an unwinding part, a metal sheet of Stainless Used Steel (SUS) material, which is wound in a roll form, and thereby continuously supplying the metal sheet;
   heating, by a first heating chamber part, the metal sheet continuously supplied from the unwinding part to a first predetermined temperature;
   by a film bond adhesion part, continuously moving the metal sheet heated by the first heating chamber part and a film-type bond between a first adhesive roller and a second adhesive roller, which are closely arranged in a vertical direction to be rotatable, and continuously adhering the film-type bond to one surface of the metal sheet;
   heating, by a second heating chamber part, the metal sheet, to which the film-type bond transferred from the film bond adhesion part is adhered, to a second predetermined temperature to strengthen adhesive force between the film-type bond and the metal sheet;
   adhering, by a protective tape adhesion part, a surface protection vinyl (SPV) protective tape to the other surface of the metal sheet where the film-type bond is not adhered; and
   by a winding part, receiving the metal sheet to which the film-type bond and the SPV protective tape are adhered, and winding the metal sheet in a roll form,
   wherein the heating by the first heating chamber part involves heating the metal sheet by heating an inner space of the first heating chamber part, in which the metal sheet moves, to a temperature of 240° C.,
   wherein the heating by the second heating chamber part involves heating the metal sheet, to which the film-type bond is adhered, by heating an inner space of the second heating chamber part, in which the metal sheet moves, to a temperature of 250° C., and
   further comprising:
   after the adhering by the protective tape adhesion part, detecting, by a defect detection part, any defects on the adhered surface between the metal sheet and the film-type bond by using vision inspection; and
   when the defect detection part notifies an adhesion defect, by a defective section notification part, identifying a section where the adhesion defect occurs, and requesting a worker to cut and discard the section where the adhesion defect occurs or remove the section,
   the identifying the section where the adhesion defect occurs involves dividing the metal sheet supplied from the unwinding part into predetermined length units and notifying the section where the adhesion defect occurs as a defective section.

2. The laminating method according to claim 1, further comprising:
   cooling, by a cooling part, the metal sheet to which the film-type bond transferred from the second heating chamber part is adhered, and transferring the cooled metal sheet to the protective tape adhesion part.

3. The laminating method according to claim 1, further comprising:
   blowing, by a roller overheating prevention part, which is installed at a front end of the film bond adhesion part, cool air in direction of the metal sheet inserted into the film bond adhesion part to prevent the film-type bond from being adhered to the first or second adhesive roller as the first or second adhesive roller is heated.

4. The laminating method according to claim 1, wherein the film bond adhesion part comprises a first air blower which sprays heated compressed air onto the one surface of the metal sheet to remove dust and other foreign substances from the one surface of the metal sheet before the film-type bond is adhered.

5. The laminating method according to claim 1, wherein the film bond adhesion part comprises a second air blower which sprays heated compressed air onto the other surface of the metal sheet to remove dust and other foreign substances from the other surface of the metal sheet before the SPV protective tape is adhered.

6. An insert injection method including a laminating process, comprising:
   receiving a metal sheet of Stainless Used Steel (SUS) material;
   adhering a film-type bond to one side of the metal sheet prepared in the receiving through a laminating process;
   performing a press molding on the metal sheet to which the film-type bond is adhered to manufacture a molded object;
   performing a first injection molding by injecting plastic resin onto one side of the molded object, to which the film-type bond is adhered, to manufacture an injected product;
   performing a second injection molding by injecting plastic resin to one side or both sides of the injected product to enhance rigidity of the injected product; and
   receiving the injected product from the performing of the second injection molding, and performing a post-injection process,
   wherein the adhering the film-type bond to the one side of the metal sheet comprises:
   continuously supplying, by an unwinding part, the metal sheet while rotating and unwinding the metal sheet, which is wound in a roll form;
   heating, by a first heating chamber part, the metal sheet continuously supplied from the unwinding part to a first predetermined temperature;
   by a film bond adhesion part, moving continuously the metal sheet and the film-type bond, which are heated by the first heating chamber part, between a first adhesive roller and a second adhesive roller, which are closely arranged in a vertical direction to be rotatable, and continuously adhering the film-type bond to one surface of the moving metal sheet;
   heating, by a second heating chamber part, the metal sheet, to which the film-type bond transferred from the film bond adhesion part is adhered, to a second predetermined temperature to strengthen adhesive force between the film-type bond and the metal sheet;

adhering, by a protective tape adhesion part, a protective tape to the other surface of the metal sheet where the film-type bond is not adhered; and by a winding part, receiving the metal sheet to which the film-type bond and the protective tape are adhered, and winding the metal sheet in a roll form, wherein the heating by the first heating chamber part includes heating the metal sheet by heating an inner space of the first heating chamber part, in which the metal sheet moves, to a temperature of 240° C., wherein the heating by the second heating chamber part includes heating the metal sheet, to which the film-type bond is adhered, by heating an inner space of the second heating chamber part, in which the metal sheet moves, to a temperature of 250° C., wherein the adhering the film-type bond to the one side of the metal sheet further comprises, after the adhering by the protective tape adhesion part detecting, by a defect detection part, any defects on the one surface between the metal sheet and the film-type bond by using vision inspection, wherein the adhering the film-type bond to the one side of the metal sheet further comprises, when the defect detection part notifies an adhesion defect, identifying, by a defective section notification part, a section where the adhesion defect occurs, and requesting a worker to cut and discard the section where the adhesion defect occurs or remove the section, and wherein the identifying by the defective section notification part involves dividing the metal sheet supplied from the unwinding part into predetermined length units and notifying the section where the adhesion defect occurs as a defective section.

* * * * *